United States Patent
Leary

(10) Patent No.: US 6,345,857 B1
(45) Date of Patent: Feb. 12, 2002

(54) LATERALLY EXTENSIBLE SUN SHIELD

(76) Inventor: Leila R. Leary, 1085 E. 1479 Rd., Lawrence, KS (US) 66046

(*) Notice: Subject to any disclaimer, the term of this patent is extended or adjusted under 35 U.S.C. 154(b) by 0 days.

(21) Appl. No.: 09/712,050

(22) Filed: Nov. 14, 2000

(51) Int. Cl.[7] .................................................. B60J 3/00
(52) U.S. Cl. ................. 296/97.7; 296/97.9; 296/97.11; 296/97.1
(58) Field of Search ............................. 296/97.7, 97.9, 296/97.11, 97.1

(56) References Cited

U.S. PATENT DOCUMENTS

| | | | |
|---|---|---|---|
| 3,868,293 A | | 2/1975 | Selph |
| 4,172,613 A | | 10/1979 | Furando |
| 4,607,875 A | * | 8/1986 | McGirr ........................ 296/97 |
| 4,736,980 A | * | 4/1988 | Eubanks ..................... 296/97 |
| 4,749,222 A | | 6/1988 | Idland |
| 4,790,591 A | * | 12/1988 | Miller ....................... 296/97.7 |
| 4,862,944 A | | 9/1989 | Hendershot |
| 4,921,299 A | * | 5/1990 | Herrick ..................... 296/97.8 |
| 5,016,937 A | * | 5/1991 | White ....................... 296/97.7 |
| 5,044,685 A | * | 9/1991 | Yang ........................ 296/97.6 |
| 5,064,239 A | * | 11/1991 | Folcik ....................... 296/97.7 |
| 5,100,194 A | * | 3/1992 | Decker ...................... 296/97.7 |
| 5,165,462 A | * | 11/1992 | Kang ........................ 296/97.7 |
| 5,205,604 A | * | 4/1993 | Smith ...................... 296/97.11 |
| 5,247,391 A | * | 9/1993 | Gormley .................... 296/97.1 |
| 5,258,214 A | | 11/1993 | Cooledge et al. |
| 5,333,927 A | * | 8/1994 | Prejean ...................... 296/97.7 |
| 5,362,119 A | * | 11/1994 | Rosentratter ............... 296/97.8 |
| 5,829,507 A | | 11/1998 | Pawlowski |
| 5,914,158 A | | 6/1999 | McGuiness |
| 6,086,132 A | | 7/2000 | Larson et al. |

* cited by examiner

Primary Examiner—Joseph D. Pape
Assistant Examiner—Kiran B. Patel
(74) Attorney, Agent, or Firm—Dale J. Ream

(57) ABSTRACT

A sun shield for attachment to an automobile windshield includes an elongate housing having a rear surface and a bottom surface. The bottom surface of the housing defines a plurality of channels that extend longitudinally between side walls thereof. A primary sheet of flexible, vinyl plastic film extends downwardly from the rear surface of the housing for electrostatically adhering to the windshield. The sun shield includes a plurality of auxiliary sheets of vinyl plastic film, each auxiliary sheet having a slide bar complementary to a corresponding channel and slidably movable therealong. The primary sheet and auxiliary sheets are flexible and tinted. Therefore, the housing may be removably coupled to the windshield and the auxiliary sheets may be slidably laterally moved to shield a driver from sunlight not directly blocked by the primary sheet.

15 Claims, 3 Drawing Sheets

LATERALLY EXTENSIBLE SUN SHIELD

BACKGROUND OF THE INVENTION

This invention relates generally to sun blocking devices and, more particularly, to a sun shield for electrostatic attachment to an automobile windshield having auxiliary sheets of tinted material laterally extensible so as to block sunlight not blocked by a primary tinted panel.

The low angle of the sun at sunrise or near sunset presents a significant visual impairment to drivers directly facing or nearly directly facing the sun. The intensity of this glare can be almost blinding. The sunvisors that are standard in most automobiles are often inadequate to block low angle sun rays or to block sun rays not directly aligned with the visor.

Various devices have been proposed for attachment to an automobile's front windshield for blocking direct sunlight. Although assumably effective for their intended purposes, existing devices do not provide a laterally extensible sun shield for selectively blocking sunlight streaming in through a windshield from laterally changing angles.

Therefore, it is desirable to have a sun shield that may be laterally adjusted upon a windshield to block sunlight entering from different angles. Further, it is desirable to have a sun shade that may be electrostatically coupled to a windshield such that no residue is left upon removal.

SUMMARY OF THE INVENTION

A laterally extensible sun shield for attachment to an interior surface of an automobile windshield includes an elongate housing having a rear surface constructed of a vinyl plastic film that electrostatically adheres to the windshield. The housing is substantially transparent so as not to present a visual impairment to the driver when attached to the windshield. A tinted primary sheet of vinyl plastic film extends downwardly from the rear surface of the housing. A bottom surface of the housing defines a plurality of longitudinally extending channels. The sun shield further includes a plurality of tinted auxiliary sheets of vinyl plastic film. A slide bar having a configuration complementary to a configuration of the channels is attached to the upper edge of each auxiliary sheet and is mounted in a corresponding channel. The slide bars are slidable within respective channels such that the auxiliary sheets may be selectively positioned in overlapping or laterally displaced relation relative to the primary sheet.

Therefore, a general object of this invention is to provide a sun shield that may be attached to an automobile windshield by positioning a static cling material thereon.

Another object of this invention is to provide a sun shield, as aforesaid, having primary and auxiliary sheets for blocking sunlight, the auxiliary sheets being laterally slidable so as to block sunlight streaming in from an angle.

Still another object of this invention is to provide a sun shield, as aforesaid, which may be repeatedly attached and removed from a window without losing any adherence properties.

Yet another object of this invention is to provide a sun shield, as aforesaid, that is easy and economical to manufacture.

Other objects and advantages of this invention will become apparent from the following description taken in connection with the accompanying drawings, wherein is set forth by way of illustration and example, an embodiment of this invention.

BRIEF DESCRIPTION OF THE DRAWINGS

FIG. 3b is a sectional view of the sun shield taken along line 3b—3b of FIG. 3a.

DESCRIPTION OF THE PREFERRED EMBODIMENT

Figure 1:
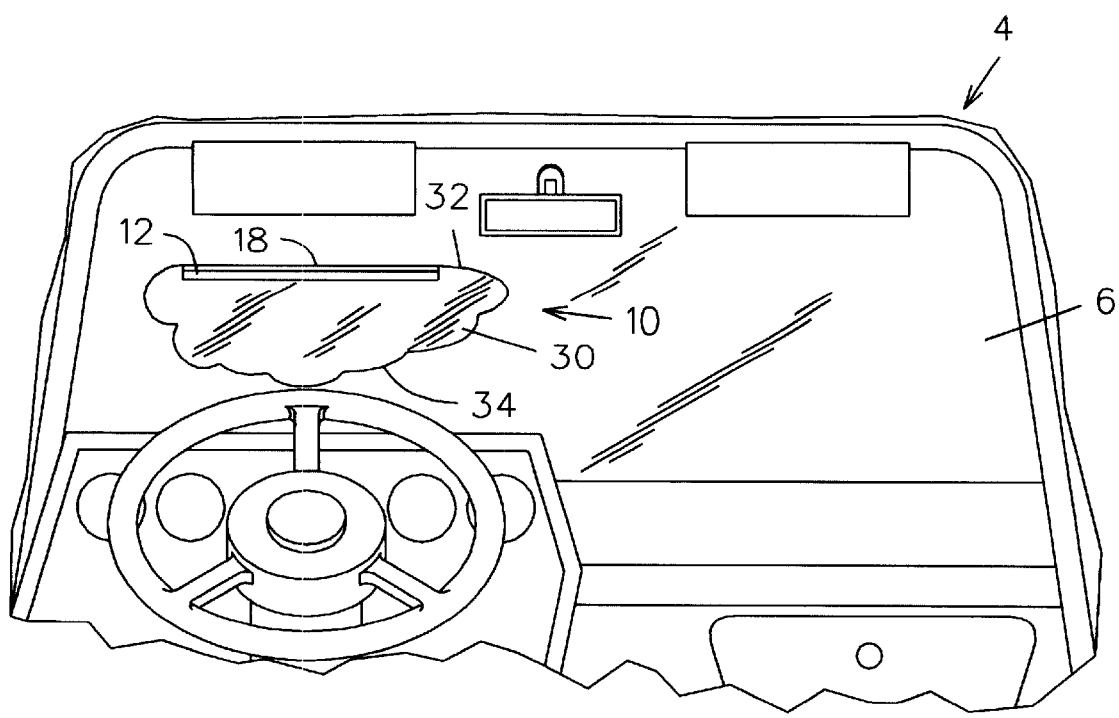
FIG. 1 is an elevated front view of a laterally extensible sun shield according to the present invention mounted to an automobile windshield in a retracted configuration.
Figure 2:
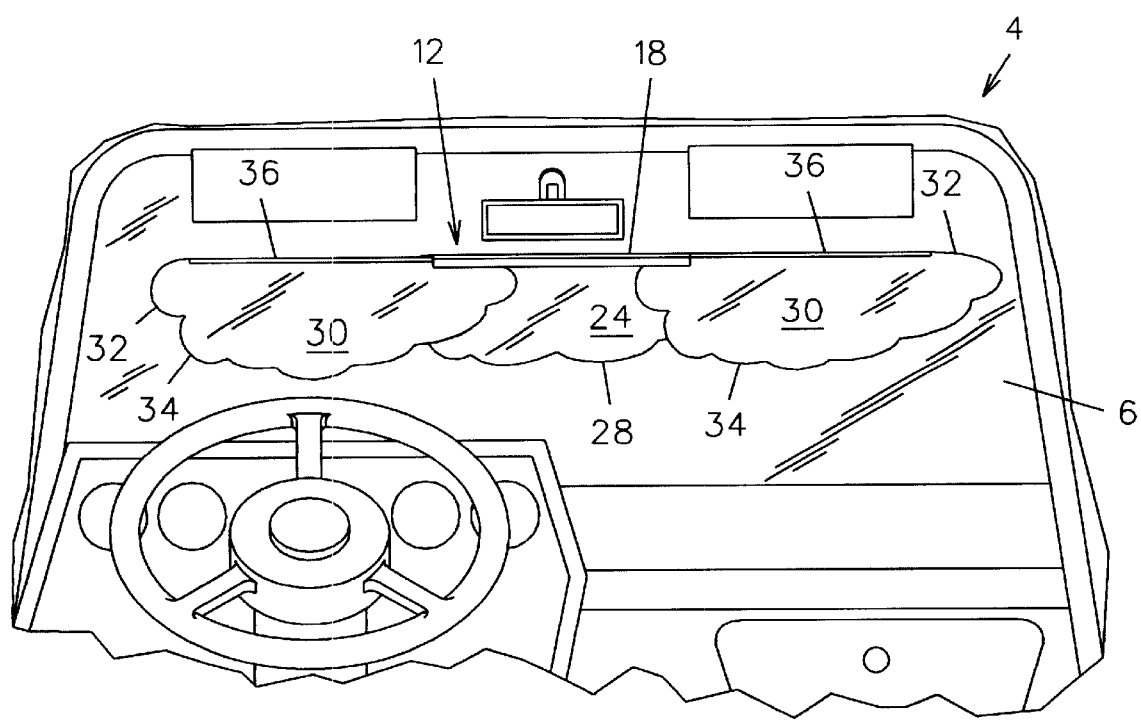
FIG. 2 is an elevated front view of the sun shield as in FIG. 1 in an extended configuration.
Figure 3A:
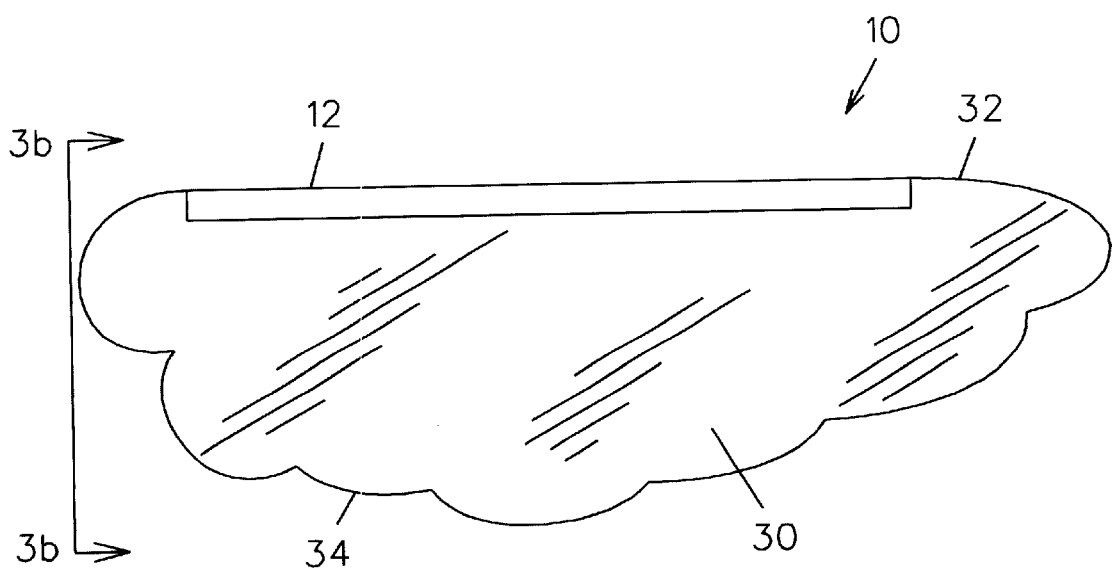
FIG. 3a is a front view of the sun shield in a retracted configuration removed from the windshield.
Figure 3B:
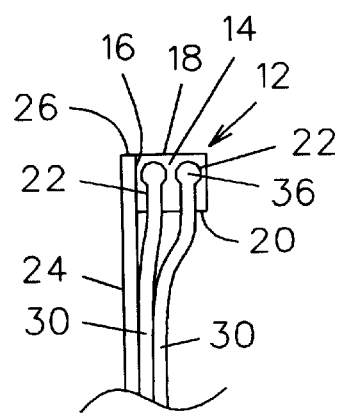

A laterally extensible sun shield 10 for attachment to a windshield 6 of an automobile 4 according to the preferred embodiment of the present invention will now be described with reference to FIGS. 1 through 3b of the accompanying drawings. The sun shield 10 includes an elongate housing 12 having opposed side walls 14 with a flat rear surface 16 and top 18 and bottom 20 surfaces extending longitudinally therebetween. The bottom surface 20 of the housing 12 defines a plurality of channels 22 extending longitudinally between the side walls 14 (FIG. 3b). The side walls 14 define apertures in communication with corresponding channels 22. Each channel 22 includes a generally spherical recess.

A primary sheet 24 of substantially transparent vinyl plastic electromagnet film is fixedly attached to the rear surface 16 of the housing 12 and extends downwardly therefrom. The primary sheet 24 includes a linear upper edge 26 and a generally annular lower edge 28 such that the primary sheet 24 resembles a cloud. More particularly, the lower edge 28 forms a series of successive annular edges having an irregular configuration. The primary sheet 24 includes a degree of tinted material for reducing the transmission of sun rays therethrough. Preferably, the primary sheet 24 is flexible such that the sun shield 10 may be rolled up for storage in a glove compartment. When positioned upon a windshield, the generally flat primary sheet 24 adheres thereto in an electrostatic cling relationship. Multiple attachments or removals of the primary sheet 24 do not reduce the efficacy of the material and leaves no residue on the windshield.

The sun shield 10 further includes a plurality of auxiliary sheets 30 of vinyl plastic electrostatic film. Each of these auxiliary sheets 30 is tinted and flexible and exhibits the same attachment characteristics as described previously relative to the primary sheet 24. Further, each auxiliary sheet 30 includes a configuration that is substantially similar to that of the primary sheet 24, namely, each auxiliary sheet 30 includes a linear upper edge 32 and an annular lower edge 34 configured to resemble a cloud (FIG. 2). An elongate slide bar 36 having a generally spherical configuration complementary to the configuration of each channel 22 is fixedly attached to upper edges of respective auxiliary sheets 30 and extends longitudinally therealong. The slide bars 36 are coupled within corresponding channels for slidable movement therein. Therefore, the auxiliary sheets 30 may be slidably positioned so as to successively overlap one another (FIG. 3b) or positioned to laterally extend to the left or right of the housing 12 and primary sheet 24 (FIG. 2).

In use, a driver may position and apply the sun shield 10 at a desired location upon the interior of an automobile windshield. The primary sheet 24 attached to the housing 12 electrostatically adheres to the windshield (FIG. 1). In a first retracted configuration, the auxiliary sheets 30 overlap and adhere to one another and to the primary sheet 24 (FIG. 3b). In this configuration, the driver may avoid the glare of sun rays streaming directly through the sun shield 10. However, if sun rays stream through the windshield at an angle not blocked by the primary sheet 24, such as when the vehicle has changed direction as a result of a bend in the road, one or more auxiliary sheets 30 may be slidably extended to the left or right of the primary sheet 24. A slide operation requires the driver to lift the lower edge of an auxiliary sheet 30 so as to overcome the static cling between successive sheets and then provide gentle lateral force thereto to slide the corresponding slide bar 36 within a corresponding channel 22. The side wall apertures allow the respective slide bar to extend outwardly from the housing 12. Once positioned, the auxiliary sheet 30 may be gently pressed against the windshield for static cling attachment. When the sun shield 10 is no longer needed, the auxiliary sheets 30 may be slidably moved into the overlapping configuration and the sheets may be rolled up for storage in a glove compartment.

It is understood that while certain forms of this invention have been illustrated and described, it is not limited thereto except insofar as such limitations are included in the following claims and allowable functional equivalents thereof.

Having thus described the invention, what is claimed as new and desired to be secured by Letters Patent is as follows:

1. A laterally extensible sun shade for attachment to an automobile windshield, comprising:

an elongate substantially transparent housing having a rear surface and a bottom surface, said a bottom surface defining a channel longitudinally therealong;

a primary sheet of vinyl plastic material depending from said rear surface of said housing, said primary sheet having a flat surface adapted to electrostatically engage and removably adhere to said windshield; and an auxiliary sheet of vinyl plastic material having a flat surface adapted to electrostatically engage and removably adhere to said windshield, said auxiliary sheet having a structure extending along an upper edge thereof and mounted in said channel for slidable movement therealong between a first configuration overlaying said primary sheet and a second configuration laterally displaced from said primary sheet.

2. The sun shade as in claim 1 wherein said auxiliary sheet overlays said primary sheet at said first configuration.

3. The sun shade as in claim 1 wherein said housing includes a pair of opposed side walls, each side wall defining at least one aperture in communication with said channel such that said structure is slidable between said first and second configurations.

4. The sun shade as in claim 1 wherein said primary sheet and said auxiliary sheet are constructed of a tinted material for reducing light transmission therethrough.

5. The sun shade as in claim 1 wherein said primary sheet and said auxiliary sheet includes a linear upper edge and a generally annular lower edge having an irregular configuration indicative of a cloud.

6. The sun shade as in claim 1 wherein said primary sheet and said auxiliary sheet are constructed of a flexible material that may be rolled into a storage configuration.

7. The sun shade as in claim 1 wherein said primary sheet and said auxiliary sheet are adapted to be repeatedly electrostatically attached to and removed from said windshield without depositing a residue or losing adherence efficacy.

8. A laterally extensible sun shade for removable attachment to an automobile windshield, comprising:

an elongate substantially transparent housing having opposed side walls and a rear surface extending therebetween, said housing having a bottom surface defining a plurality of channels extending longitudinally between said side walls;

said side walls defining a plurality of apertures in communication with corresponding channels;

a primary sheet of vinyl plastic film attached to said rear surface of said housing and extending downwardly therefrom, said primary sheet having a flat surface for electrostatically engaging and removably adhering to said windshield; and a plurality of auxiliary sheets of vinyl plastic film, each auxiliary sheet having a flat surface adapted to electrostatically engage and removably adhere to said windshield, each auxiliary sheet having a slide bar fixedly attached to an upper edge thereof and coupled to a respective channel for slidable movement between a first configuration in which said auxiliary sheet overlays said primary sheet and a second configuration in which said auxiliary sheet is laterally displaced from said primary sheet.

9. The sun shade as in claim 8 wherein said plurality of auxiliary sheets overlay one another and overlay said primary sheet at said first configuration.

10. The sun shade as in claim 8 wherein each channel includes a generally spherical recess; and wherein each slide bar includes a generally spherical configuration complementary to said recess for slidable movement therealong.

11. The sun shade as in claim 8 wherein said primary sheet and said plurality of auxiliary sheets are constructed of a tinted material for reducing the light transmission therethrough.

12. The sun shade as in claim 8 wherein each of said plurality of auxiliary sheets includes a linear upper edge and a plurality of successive annular lower edges indicative of a cloud.

13. The sun shade as in claim 8 wherein said primary sheet includes a linear upper edge and a successive annular lower edges indicative of a cloud.

14. The sun shade as in claim 8 wherein said primary sheet and said plurality of auxiliary sheets are constructed of a flexible material adapted to be selectively rolled into a storage configuration.

15. The sun shade as in claim 8 wherein said primary sheet and said plurality of auxiliary sheets are adapted to be repeatedly electrostatically attached to and removed from said windshield without depositing a residue or losing adherence efficacy.

* * * * *